(12) United States Patent
Sokol et al.

(10) Patent No.: US 6,963,288 B1
(45) Date of Patent: Nov. 8, 2005

(54) APPARATUS AND METHOD FOR DISPLAYING SYSTEM STATE INFORMATION

(75) Inventors: Michael Sokol, San Jose, CA (US); Xi Chen, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 333 days.

(21) Appl. No.: 09/652,477

(22) Filed: Aug. 31, 2000

(51) Int. Cl.$^7$ ................................................. G08B 5/22
(52) U.S. Cl. ........................... 340/815.45; 340/815.47; 340/525; 340/500; 340/506; 709/224; 709/220
(58) Field of Search ............................... 340/525, 500, 340/506, 815.45, 815.47, 815.52, 815.53, 340/815.4, 825; 345/168, 172, 173, 39, 46; 709/224, 220, 217, 200

(56) References Cited

U.S. PATENT DOCUMENTS

| | | | |
|---|---|---|---|
| 4,517,671 A | | 5/1985 | Lewis |
| 4,611,193 A | * | 9/1986 | Brüggemann ............. 340/52 F |
| 4,837,552 A | * | 6/1989 | Vandemotter et al. ...... 340/525 |
| 4,933,667 A | * | 6/1990 | Shaw et al. ................. 340/525 |
| 5,027,112 A | * | 6/1991 | Ross et al. .................. 340/792 |
| 5,038,305 A | | 8/1991 | Kumar et al. |
| 5,506,767 A | | 4/1996 | Naylor |
| 5,613,115 A | | 3/1997 | Gihl et al. |
| 5,968,371 A | | 10/1999 | Verdegan et al. |
| 5,995,012 A | * | 11/1999 | Lee et al. .............. 340/814.45 |
| 5,996,004 A | | 11/1999 | White |
| 6,133,844 A | * | 10/2000 | Ahne et al. ............ 340/814.45 |

FOREIGN PATENT DOCUMENTS

| | | |
|---|---|---|
| EP | 0 428 735 | 5/1991 |
| EP | 0 777 167 | 6/1997 |
| WO | 98/14855 | 4/1998 |

* cited by examiner

*Primary Examiner*—Hung Nguyen
(74) *Attorney, Agent, or Firm*—Squire, Sanders & Dempsey L.L.P.

(57) ABSTRACT

A programmable LED display system is disclosed. The system includes a programmable controller, a driver operative to generate a control signal in response to a signal provided by the programmable controller, and a display device operative to provide a visual representation of the state of the system in response to the control signal. The system also includes means for determining which state condition is displayed when more than one state condition exists.

7 Claims, 4 Drawing Sheets

APPARATUS AND METHOD FOR DISPLAYING SYSTEM STATE INFORMATION

FIELD OF THE INVENTION

The present invention relates generally to the field of electronic display devices and more specifically to the field of communication system state information displays and extensions thereto.

BACKGROUND OF THE INVENTION

Communication systems generally use light emitting diode (LED) display devices to provide a user with information about the internal state of the system. Currently, there is no standard way to reflect system state information. Each system vendor displays system state information of their respective devices according to their own protocol. Thus, the same system state information is often displayed in several different ways across the device families of the various vendors.

LED display devices are the generally used to provide state information of the underlying system. The LED display device includes a processor, or other computation device, which is configured to receive signals from the underlying system, which represents the status of the various components (i.e. ports) of the system. In response to these signals, the processor directs an associated driver mechanism to display visual information, according to the particular system protocol, corresponding to the received signals. Based on the signals provided by the processor, the LED's convey information about the state of the underlying system by, for example, being turned on, turned off or blinking.

A drawback associated with conventional display systems is that they can only handle predefined operations. They cannot be modified to display information that they were not designed to display, or display information from another vendor. In order to obtain the state of systems from a variety of vendors, a controller is needed from each vendor. Thus, there is a need for a universal LED display device that can be used to provide system state information for a variety of controllers from different vendors.

SUMMARY OF THE INVENTION

The aforementioned and related drawbacks associated with conventional system state display devices are substantially reduced or eliminated by the present invention. The present invention is directed to a system and method for displaying system state information. The system of the present invention includes a programmable controller operative to determine the present system state of a system, the programmable controller operative to determine the present system state of the system, the programmable controller providing a signal representative of system state, a driver operative to generate a control signal in response to the signal provided by the programmable controller, and a display device operative to provide a visual representation of the state of the system in response to the control signal.

The programmable controller is flexible enough to be implemented into the systems of a variety of vendors to display the system state information thereof. The programmable controller of the present invention includes a register for storing settings appropriate to a specific application or condition, at least one port for receiving event information from the associated system and a processor operative to generate the system state signal in response to the settings and programming information stored in the register.

The method of operating the display system of the present invention, comprises the steps of providing event signals representative of the condition of the system to the controller, generating signals representative of system state in response to the event signals, and displaying a visual representation of the information representing system state in response to signals generated by the programmable controller.

An advantage provided by the present invention is the ability to display event information from a variety of communication systems from different vendors.

Another advantage provided by the present invention is that it is less expensive to implement as compared to conventional systems requiring a microprocessor.

Yet another advantage of the present invention is that it takes up less real estate than conventional systems.

A feature associated with the present invention is that it can be implemented in a variety of communications systems.

BRIEF DESCRIPTION OF THE DRAWINGS

The aforementioned and related advantages and features of the present invention will become apparent upon reviewing the following detailed description of the invention taken in conjunction with the following drawings, where like numerals represent like elements, in which.

DETAILED DESCRIPTION OF THE INVENTION

Figure 1:
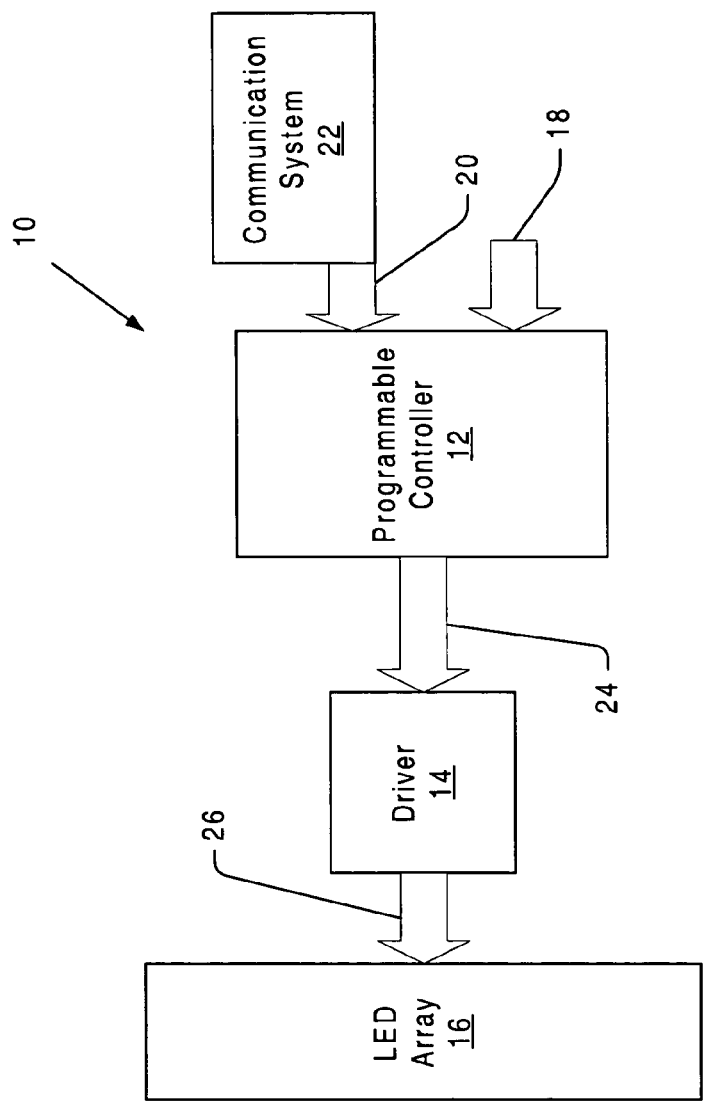
FIG. 1 is a simplified block diagram of the programmable LED system according to the present invention.

The programmable LED display device of the present invention will now be described with reference to FIGS. 1–4. FIG. 1 is a simplified block diagram of the programmable display system 10 according to the present invention. The system generally includes a programmable controller 12, a driver 14 and a display device 16. Programming information 18 appropriate to a particular system is input into the programmable controller 12. Event information 20 indicative of the present status of a corresponding communication system 22 is provided to the programmable controller 12 by the communication system. The programmable controller 12 processes the event information 20 using functions defined by the programming information 18, and produces a signal 24 indicative of the present state of the communication system 22. The operation of the programmable controller 12 is described in greater detail with reference to FIG. 2.

The driver 14 receives the signal 24 from the programmable controller 12, and generates a control signal 26 in response to the signal 24. The display device 16 receives the control signal 26, and provides a visual representation of the present state of the system in response to the control signal 26.

Figure 2:
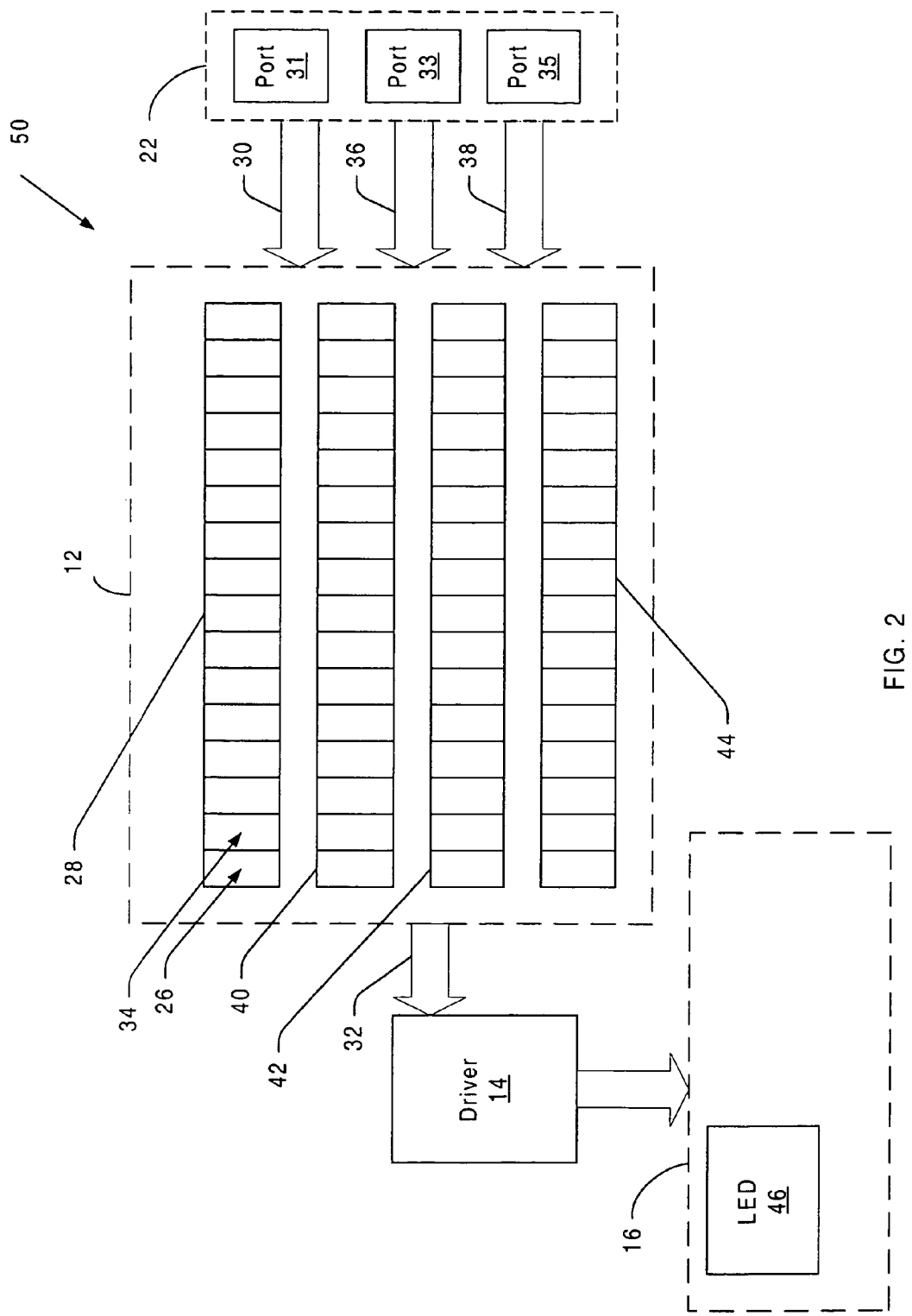
FIG. 2 is a simplified diagram of the programmable controller of the present invention.

FIG. 2 is a simplified diagram of the programmable controller 12 at 50 according to one embodiment of the present invention. The programmable controller 12 contains a plurality of sixteen bit registers (28, 40, 42, 44) which maintain the programming information 18, provided thereto. According to a preferred embodiment of the present invention, each bit stores a value (0 or 1) independent of the value of any other bit. The program information 18 (FIG. 1) determines the value of each register bit. The value of each bit is programmed to be zero or one, as is appropriate to the configuration of a particular communication system. An example of one such register is shown in Table 1.

Table 1 illustrates default bit values of an LED Effect Register 1E3.

TABLE 1

Register 1E3: LED Effect with Link Event.

| Reg.bit | Name | Description | Mode | Default |
|---------|------|-------------|------|---------|
| 15:11 | Reserved | | RO | 00000 |
| 10:8 | LED On with Link Event | When Link Up, turn on corresponding LED2:0 | RW | 011 |
| 7 | Reserved | | RO | 0 |
| 6:4 | LED Blink with Link Event Event | When Link Up, blink corresponding LED2:0 | RW | 011 |
| 3 | Reserved | | RO | 0 |
| 2:0 | LED Off with Link Event | When Link Up, turn off corresponding LED2:0 | RW | 000 | the communication system 22 containing a plurality of ports (31, 33. 35), is received by the programmable controller 12. First event signal 30 is processed by logic functions defined by the values stored in the first register 28, and the resulting status signal 32 is transmitted to the driver 14. Status signal 32 carries information indicative of the present state of the communication system 22. Driver 14 receives status signal 32 and induces a state in the first LED 46, within LED array 16, in response to status signal 32. The driver 14 causes LED 46 to turn on, blink or turn off to indicate the present condition of the communication system 22 based on the information contained in Register 1E3 (Table 1).

In the preferred embodiment of the present invention a first event signal 30 carrying information on the status of port 31 of the communication system 22 is processed with a second event signal 36 carrying different information regarding the state of port 31 using functions defined by the values stored in first register 28 and second register 40, and producing a signal 32 responsive to both first event signal 30 and second event signal 36. The event signals (30, 36, 38) determine the state (on, off, blink) of a corresponding one of the plurality of LED's of the display 16.

Table 2 illustrates the logical relationship between the event information received by the programmable controller 12 and the resulting state of the corresponding LED.

TABLE 2

Port LED Programmability Table

| Event | ON Condition | BLINK Condition | OFF Condition |
|-------|--------------|-----------------|---------------|
| Link (L) | $A_0 = (R_{A0}\&L) \mid !R_{A0}$ | $B_0 = (R_{B0}\&L) \mid !R_{B0}$ | $C_0 = (R_{C0}\&L) \mid R_{C0}$ |
| Isolate (I) | $A_1 = (R_{A1}\&I) \mid !R_{A1}$ | $B_1 = (R_{B1}\&I) \mid !R_{B1}$ | $C_1 = (R_{C1}\&I) \mid R_{C1}$ |
| Speed (S) | $A_2 = (R_{A2}\&S) \mid !R_{A2}$ | $B_2 = (R_{B2}\&S) \mid !R_{B2}$ | $C_2 = (R_{C2}\&S) \mid R_{C2}$ |
| Duplex (D) | $A_3 = (R_{A3}\&D) \mid !R_{A3}$ | $B_3 = (R_{B3}\&D) \mid !R_{B3}$ | $C_3 = (R_{C3}\&D) \mid R_{C3}$ |
| TX/RX Activity (TRA) | $A_4 = (R_{A4}\&TRA) \mid !R_{A4}$ | $B_4 = (R_{B4}\&TRA) \mid !R_{B4}$ | $C_4 = (R_{C4}\&D) \mid R_{C4}$ |
| TX Activity (TA) | $A_5 = (R_{A5}\&TA) \mid !R_{A5}$ | $B_5 = (R_{B3}\&TA) \mid !R_{B5}$ | $C_5 = (R_{C5}\&TA) \mid !R_{C5}$ |
| RX Activity (RA) | $A_6 = (R_{A6}\&RA) \mid !R_{A6}$ | $B_5 = (R_{B6}\&RA) \mid !R_{B6}$ | $C_6(R_{C6}\&RA) \mid !R_{C6}$ |
| Auto-Negotiate Active (N) | $A_7 = (R_{A7}\&N) \mid !R_{A7}$ | $B_7 = (R_{B7}\&N) \mid !R_{B7}$ | $C_7(R_{C7}\&N) \mid !R_{C7}$ |
| Port Disabled (PD) | $A_8 = (R_{A8}\&PD) \mid !R_{A8}$ | $B_8 = (R_{B8}\&PD) \mid !R_{B8}$ | $C_8 = (R_{C8}\&PD) \mid !R_{C8}$ |
| Collision (C) | $A_9 = (R_{A9}\&C) \mid !R_{A9}$ | $B_9(R_{B9}\&C) \mathrm{I} !R_{B9}$ | $C_9 = (R_{C9}\&C) \mid !R_{C9}$ |
| Result | $LED_{ON} = (A_0\&A_1\&A_2\&A_3 \&A_4\&A_5\&A_4\&A_7\&A_8\& A_9)\&(\overline{LED}_{BLINK}\&\overline{LED}_{OFF})$ | $LED_{BLINK} = (B_0\&B_1\&B_2\& B_3\&B_4\&B_5\&B_6\&B_7\&B_8 \&B_9)\&\overline{LED}_{OFF}$ | $LED_{OFF} = (C_0\&C_1\&C_2\& C_3\&C_4\&C_5\&C_6\&C_7\&C_8 \&C_9)$ |

As shown in Table 1, bits 10:8 of Register 1E3 control when LED's 0 through 2 turn on. Bits 6:4 control when LED's 0 through 2 blink. Bits 2:0 control when LED's 0 through 2 turn off. Bits 15:11, 7 and 3 are reserved. LED's 0 through 2 will blink when a Link occurs and bits 6:4 have corresponding values of 011. LED's 0 through 2 will not turn off when a Link occurs when the value of bits 2:0 have corresponding values of 000. Due to an LED operating hierarchy, LED's 0 through 2 will blink rather than be turned on when bits 10:8 have correspond values of 011 and bits 6:4 have corresponding values of 011. This relationship is explained in more detail in Table 2.

In one embodiment of the present invention a first event signal 30 carrying information relating to the present state of A0 through A9 represent intermediate variables of the logic equations which determine when LED 46 turns on. The events occurring in a corresponding port of the communication system 22 are represented by variables Link (L), Isolate (I), Speed (S), Duplex (D), TX/RX (TRA), TX Activity (TA), RX Activity (RA), Auto-Negotiate Active (N), Port Disabled (PD) and Collision (C). As illustrated in Table 2, $LED_{on}=1$ (or true) when $A_0$ through $A_9=1$ and $LED_{BLINK}$ and $LED_{OFF}=0$ (or false). When $LED_{on}=1$ (or true), the programmable controller 12 transmits the status signal 32 which directs the driver 16 to turn first LED 46 on. First LED 46 will be directed to blink when $LED_{BLINK}=1$ (or true) in the same manner as first LED 46 is directed to turn on when $LED_{on}$ equals one (or true) as described above. First LED 46 will be directed to turn off when $LED_{OFF}=1$ (or true) in the same manner as first LED 46 is directed to turn on when $LED_{on}$ equals one (or true) as described above.

As illustrated in Table 2, the Off condition of an LED supercedes the Blink condition, which in turn supercedes the On condition. This occurs because $LED_{ON}$=true requires that both $LED_{OFF}$ and $LED_{BLINK}$ are false, as shown in the result of the ON Condition column of Table 2. Similarly for $LED_{BLINK}$ to be true $LED_{OFF}$ must be false.

In an exemplary embodiment programming information 18 (FIG. 1) sets register values $R_{A0}$, $R_{A1}$, $R_{A6}$ and $R_{B9}$ to 1, and all other register bits to 0. LED 46 will turn on when the Link (L) event in port 31 occurs, the Isolate (I) event in port 31 occurs, and the RX Activity (RX) event in port 31 occurs, but no other event occurrence will cause LED 46 to turn on. LED 46 will blink, for example, when the Collision (C) event in port 31 occurs.

First LED 46 can be turned on, off, or blink by manipulating the values of register bits $R_{A0}$ through $R_{c9}$ as illustrated by the equations of Table 2. The programmable controller 12 can be programmed through the input of programming information 18 to cause any LED in array 16 corresponding to a particular port to turn on, off or blink in response to any event or any combination of events occurring in that port.

Figure 3:
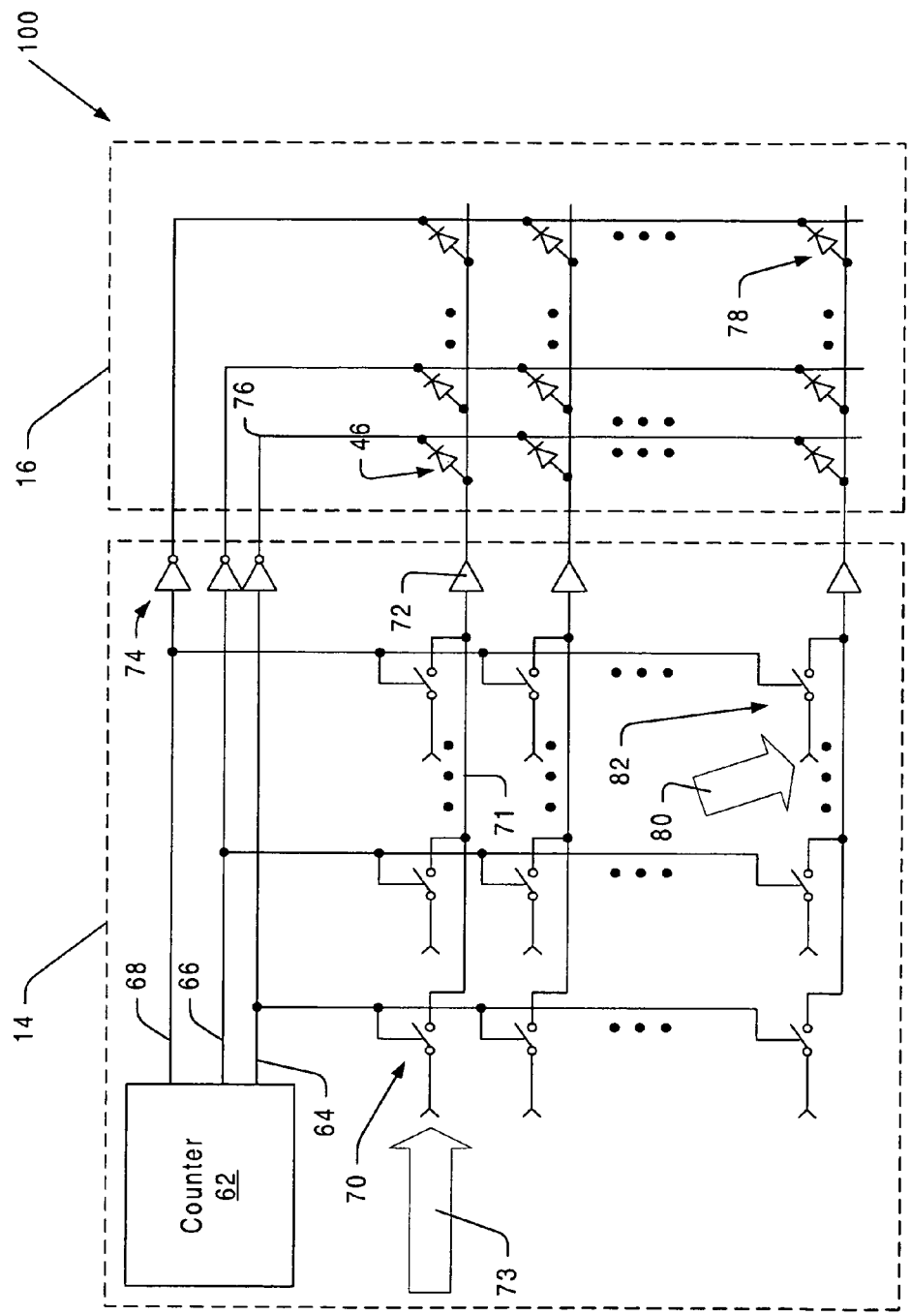
FIG. 3 is a simplified diagram of the driver of the present invention.

FIG. 3 is a schematic circuit diagram of the driver 14 and LED array 16 of one embodiment of the present invention at 100. The driver 14 includes a state machine 62 and a plurality of relay lines (64, 66, 68). Each of the relay lines controls the active status of a corresponding column of LED's 46 within the LED array 16.

According to a preferred embodiment of the present invention, the state machine 62 is a counter which consecutively induces a positive voltage signal for a short time period in each of the relay lines. Thus, for example, when a voltage is provided on relay line 64, the corresponding column 76 of LED's in array 16 is made active. When first relay line 64 induces a positive voltage signal in a first tri-state device 70, tri-state device 70 will close and allow a first signal portion 73 of the signal 24 (FIG. 2) from programmable controller 12 (FIG. 2) directed to first LED 46 to transmit through tri-state device 70 along a first driver line 71, and through first latch 72, transmitting a positive voltage signal to the anode of first LED 46. At the same time the positive voltage signal in the first relay line 64 will be inverted by a first inverter 74 and transmit a negative voltage signal through a first column line 76 of the LED array 16 to a cathode lead of first LED 46. If the cathode lead of first LED 46 receives a positive voltage signal while the anode lead of first LED 46 receives a negative voltage signal, current will pass through first LED 46 and first LED 46 will emit light. First LED 46 will only emit light when first relay line 64 carries a positive voltage signal and first tri-state device 70 receives a positive voltage signal from the programmable controller 12. First tri-state device 70 is one tri-state device in an array of identical tri-state devices. A second LED 78 will only emit light when third relay line 68 carries a positive voltage value and a second signal portion 80 of signal 24 (FIG. 2) transmits a positive voltage value to a second tri-state device 82. In this way an LED array of nine LEDs can be driven with only three relay lines and three driver lines, and an LED array of sixteen LEDs can be driven by four relay lines and four driver lines. In the preferred embodiment sixty-four LEDs are driven by eight relay lines and eight driver lines, with sixty-four tri-state devices receiving portions of the signal 24 (FIG. 2).

Because an LED in the LED array 16 can emit for a portion of the cycle generated by counter 62, counter 62 must cycle through the relay lines rapidly enough such that a human eye cannot discern the cycles in the light emitted by the LEDs. To facilitate blinking in first LED 46, the first signal portion 73 will carry a positive signal for only a portion of time such that first LED 46 will blink. The blink rate of signal portion 73 will be much lower than the cycle rate of counter 62. An exemplary blink rate for signal portion 73 of two to four hertz is desirable.

Figure 4:
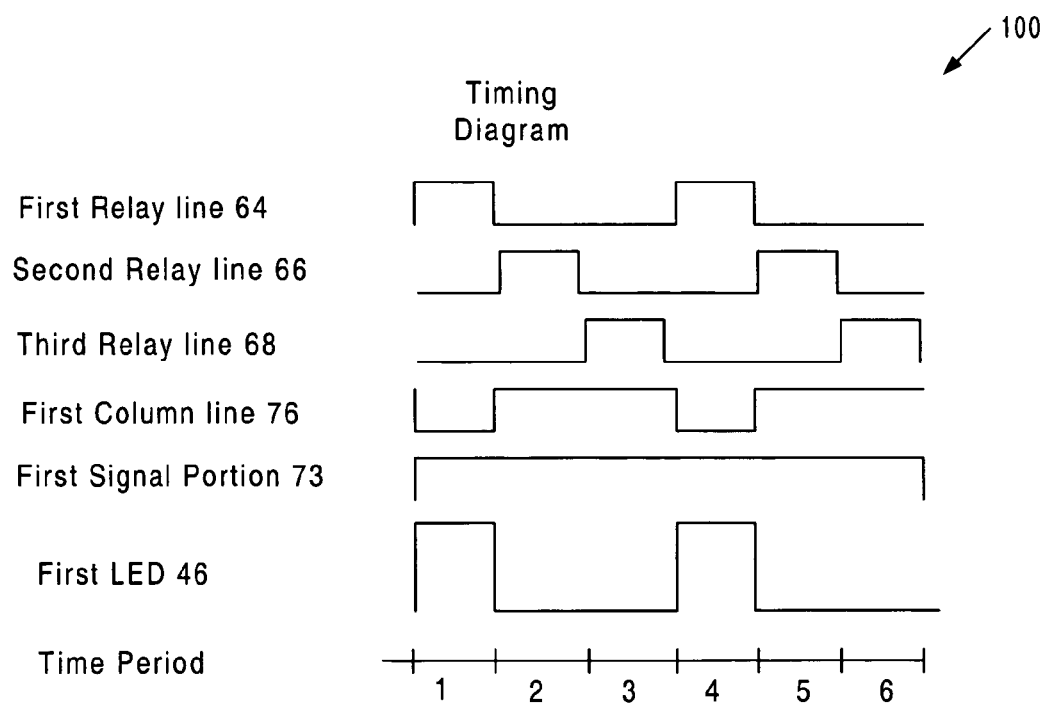
FIG. 4 is a timing diagram showing operation and control signals at various points on the device at various times.

FIG. 4 is a timing diagram showing voltage values of the programmable display apparatus. At time period 1 first relay line 64 carries a positive voltage value, first column line 76 carries a negative voltage value and first signal portion 73 carries a positive voltage value. These values cause first LED 46 to carry a positive voltage value and emit light. At time period 4 first relay line 64 carries a positive voltage value, first column line 76 carries a negative voltage value and first signal portion 73 carries a positive voltage value causing first LED 46 to again emit light. At time period 2 and time period 3 first LED 46 does not emit light. This period of time when first LED 46 is not emitting light is not discernable to human vision.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. An apparatus comprising:
   a programmable controller operative to determine a present state of a system based on event signals received from the system, the programmable controller providing a signal representative of the system state;
   a driver operative to generate a control signal in response to the signal provided by the programmable controller; and
   a display device operative to provide a visual representation of the state of the system in response to the control signal, wherein said display device comprises an array of light emitting diodes, arranged in a matrix;
   wherein the system has a plurality of ports, with at least one port of the plurality of ports providing at least one of the event signals, where the at least one event signal carries information on a status of the at least one port with respect to transmission and receipt of data by the at least one port; and
   wherein said programmable controller further comprises a register for storing programming information, a port for receiving event information, and a processor operative to generate the signal responsive of the system state in response to the event information and the programming information stored in the register.

2. The apparatus of claim 1, wherein the register further comprises:
   multiple bits, each bit storing a value of zero or one.

3. The apparatus of claim 1, wherein the driver further comprises:
   an array of tri-state devices.

4. The apparatus of claim 1, wherein the display device further comprises:
   a light emitting diode.

5. A method of operating a display system, comprising the steps of:
   providing event signals representative of a condition of a system to a programmable controller;

generating signals representative of system state in response to the event signals; and displaying a visual representation of information representing system state in response to signals generated by the programmable controller;

wherein the system has a plurality of ports, with at least one port of the plurality of ports providing at least one of the event signals, where the at least one event signal carries information on a status of the at least one port with respect to transmission and receipt of data by the at least one port, and wherein said programmable controller further comprises a register for storing programming information, a port for receiving event information, and a processor operative to generate the signal responsive of the system state in response to the event information and the programming information stored in the register.

6. The method of claim 5, further comprising the step of:

providing programming information to the programmable controller.

7. A programmable display controller for controlling a display device based on event information indicative of a current one of a set of predefined states of a communication system, comprising:

a programmable controller responsive to programming information defining a selected display state associated with each of the states of the communication system, the programmable controller being operative to generate a control signal indicative of a current display state based on the current state of the communication system and said programming information;

wherein the event information of the communication system is based on event signals received from the communication system and wherein the communication system has a plurality of ports, with at least one port of the plurality of ports providing at least one of the event signals, where the at least one event signal carries information on a status of the at least one port with respect to transmission and receipt of data by the at least one port, and wherein the programmable controller further comprises at least one register for storing programming information, at least one port for receiving event information, and a processor operative to generate a signal in response to the event information and the settings stored in the register.

* * * * *